(12) United States Patent
Hashimoto et al.

(10) Patent No.: US 6,397,282 B1
(45) Date of Patent: May 28, 2002

(54) COMMUNICATION CONTROLLER FOR TRANSFERRING DATA IN ACCORDANCE WITH THE DATA TYPE

(75) Inventors: Hiroshi Hashimoto; Kazuya Iwamoto, both of Utsunomiya; Yuji Nagatani, Minamikawachi-machi, all of (JP)

(73) Assignee: Honda Giken Kogyo Kabushikikaisha, Tokyo (JP)

( * ) Notice: Subject to any disclaimer, the term of this patent is extended or adjusted under 35 U.S.C. 154(b) by 0 days.

(21) Appl. No.: 09/287,485

(22) Filed: Apr. 6, 1999

(30) Foreign Application Priority Data

Apr. 7, 1998  (JP) ............................................ 10-094245
Apr. 8, 1998  (JP) ............................................ 10-095704

(51) Int. Cl.⁷ .......................... G06F 13/26; G06F 15/16
(52) U.S. Cl. ...................................... 710/260; 709/207
(58) Field of Search ................................ 710/260–269; 370/351–430; 709/200–207

(56) References Cited

U.S. PATENT DOCUMENTS

| | | | | | |
|---|---|---|---|---|---|
| 4,466,062 A | * | 8/1984 | Krikor | ........................ | 710/44 |
| 4,504,906 A | * | 3/1985 | Itaya et al. | .................. | 710/100 |
| 4,642,630 A | * | 2/1987 | Beckner et al. | .......... | 340/825.5 |
| 5,001,642 A | * | 3/1991 | Botzenhardt et al. | ....... | 701/115 |
| 5,359,344 A | * | 10/1994 | Inoue et al. | ................ | 345/100 |
| 5,602,852 A | * | 2/1997 | Shiobara | .................... | 370/455 |
| 5,659,758 A | * | 8/1997 | Gentry et al. | ................ | 710/260 |
| 5,943,479 A | * | 8/1999 | Klein et al. | .................. | 709/212 |
| 5,983,275 A | * | 11/1999 | Ecclesine | .................... | 709/231 |
| 6,084,631 A | * | 7/2000 | Tonkin et al. | .............. | 348/212 |
| 6,115,776 A | * | 9/2000 | Reid et al. | .................. | 710/260 |
| 6,185,438 B1 | * | 2/2001 | Fox | ............................ | 455/560 |

FOREIGN PATENT DOCUMENTS

| | | |
|---|---|---|
| JP | 54-78039 | 6/1979 |
| JP | 5-292102 | 11/1993 |
| JP | 5-316124 | 11/1993 |

\* cited by examiner

*Primary Examiner*—Sumati Lefkowitz
(74) *Attorney, Agent, or Firm*—Seed IP Law Group PLLC

(57) ABSTRACT

A communication controller comprises a storage for storing data of a message being received, a determining unit for determining types of the message being received, and a transmission controller for generating interrupt requests for transferring data to a data processing unit at a different timing responsive to determination by the determining unit. That is, if the message being received requires immediate processing, the transmission controller immediately transmits an interrupt request signal to a CPU. The CPU then reads from the storage not only the data which require urgent processing but also all the data stored in the storage, and stores the data in its memory. If the message does not require immediate processing, the transmission controller transmits the interrupt request signal to the CPU when the data stored in the storage have reached a predetermined amount or when a predetermined time has elapsed from a time that the data began to be stored in the storage.

14 Claims, 6 Drawing Sheets

DATA MESSAGE

| 1 | 4 | 2 | 32–96 | 15 | 4 | 4 | 6 |
|---|---|---|---|---|---|---|---|
| SOM | TA | CTL | DATA UNIT | FCS | DACK | TACK | EOM |

CODES OF THE CTL FIELD

| CODE | DETAIL | CODE | DETAIL |
|---|---|---|---|
| 00 | NOT DEFINED | 01 | DATA MESSAGE WHICH DOES NOT REQUIRE URGENT PROCESSING |
| 10 | TOKEN MESSAGE | 11 | DATA MESSAGE WHICH REQUIRES URGENT PROCESSING |

COMMUNICATION CONTROLLER FOR TRANSFERRING DATA IN ACCORDANCE WITH THE DATA TYPE

TECHNICAL FIELD

The present invention relates to a computer network, and more specifically to a communication controller which controls reception and transfer of data between a computer and a data transmission line.

BACKGROUND OF THE INVENTION

Functions generally needed between a computer and data transmission line include: 1) an electric/physical interface with the line, 2) connection control of the line, 3) reception signal selection, 4) assembly and decomposition of characters, 5) buffering of data, 6) error control, 7) matching of data transmission speed and processing speed of the computer, 8) transmission control, and 9) assembly and decomposition of messages. A communication controller handles all or a part of these functions, and is provided between the computer and the data transmission line so that the computer can be dedicated to perform high level data processing.

Depending on how to allocate the above-identified functions, the communication controller is classified into a bit buffer scheme, a character buffer scheme, a block buffer scheme, and a message buffer scheme.

The bit buffer scheme is a scheme in which the communication controller takes charge up to assembly of the received bits, and the computer takes charge of the process after character assembly. The character buffer scheme is a scheme in which the communication controller assembles received bits into a character, and the assembled character is transferred to a main memory of the computer. The block buffer scheme is a scheme in which the communication controller performs the buffering of a transmission block, and clean data is transferred to the memory of the computer. The message buffer scheme is a scheme in which the communication controller performs assembly and decomposition of the transmission message. These schemes can be further classified into a number of schemes in terms of detailed functions to be performed. The boundary of the communication controller and the computer changes depending on the design of the system.

Patent Application Publication (Kokai) No. 54-78039 describes a system wherein buffer memories 7 and 7' are provided for each line between a communication controller 1 and a processor 6, and the processor 6 performs interruption processing for each line and reads out information from the buffer memory according to the line for batch processing.

Kokai 5-292102 and 5-316124 describe a data transmission system wherein a communication control IC included in an electronic control unit (ECU) controls transmission of message to a network bus and reception of message from the network bus.

Usually, the transmitted data contain data which do not require immediate processing and data which require immediate processing. For instance, in the on-board computer network described in Kokai 5-292102 and Kokai 5-316124, data indicating a temperature of cooling water and transmitted to a transmission ECU from an engine ECU need not be processed immediately because the data is not the type which concerns a parameter that changes instantaneously. For instance, a processing delay of about one second does not become a problem. On the other hand, for example, when the transmission ECU handles a speed change, it is necessary to delay ignition timing of the engine and to decrease output torque of the engine temporarily so as to make a smooth connection of the clutch. This processing should be performed within about one millisecond, and therefore, data relating to the transmission ECU requesting the engine ECU to decrease torque should be processed immediately in the engine ECU.

A conventional communication controller does not carry out processes according to urgency and the type of such data. If the frequency by which data is transferred from communication controller to data processor is set high to meet the needs of data of high urgency, the load of data processor increases and the performance of the entire data processing decreases.

SUMMARY OF THE INVENTION

Therefore, it is an advantage of embodiments of the present invention to provide a system that performs speedy processing of data requiring urgency without causing substantial increase of the load of the data processor.

To address the above-mentioned problem, a communication controller of an embodiment of the invention comprises a storage for storing the data of the message being received, a determining unit for determining types of message being received, and a transmission controller for generating interruption requests at different timing for transferring data to the data processor responsive to the determining unit.

According to an embodiment of the present invention, interruption requests to transfer data are generated at different timing according to the types of the message. That is, for instance, an interruption request is generated immediately for the message of the type which requires urgency. An interruption request is generated by another criteria relative to a message which is not urgent. Therefore, data which requires urgency is transferred to a data processor speedily without interrupting the data processor too frequently. Thus, an efficient system operation is achieved.

In accordance with one aspect of the invention, in a computer system having a data processor and a communication controller that controls data reception to the data processor, the communication controller comprises a storage for storing data of a received message, a determining unit for determining whether the received message requires immediate processing or not, and a transmission controller for generating an interruption request to transfer data stored in the storage in response to a determination by the determining unit that the message received requires immediate processing, wherein when interruption takes place, data in the storage, which have been stored by that time and are yet to be transferred, are transferred to the data processor.

When data which require immediate processing are transferred, data which have been stored in the storage by then are transferred together so that data which require immediate processing are transferred speedily without substantially increasing a frequency of interruption to the data processor. Thus, an efficient system operation is achieved.

In accordance with another aspect of the invention, when the message which requires immediate processing is not received, as data stored in the storage reach a predetermined amount, the transmission controller generates an interruption request for transferring the data. According to such an aspect of the invention, data which do not require immediate processing are processed without causing excessive delay.

In accordance with a further aspect of the invention, when the message which requires immediate processing is not received, as a predetermined time passes from a time a first one of the data is stored in the storage, the transmission controller generates an interruption request for transferring the data in the storage. According to such further aspect of the invention, even when an amount of the data transmission is small, data are processed without excessive delay.

According to yet another aspect of the invention, a communication controller comprises a plurality of storage units for storing data of received messages, a selection unit for selecting one of the plurality of the storage units according to a type of the received message and having the data of the message stored therein, wherein a transfer of data stored in the storage units to a data processor is controlled according to the type of the message. The plurality of storage units physically can be one memory where a plurality of different storage areas are allocated.

According to such an aspect of the invention, data which the communication controller receives are stored in different storage units according to its type, and transfer to the data processor is controlled according to the type of data so that, for instance, data which require immediate processing are transferred immediately to the data processor and data which do not require immediate processing are treated according to the type, whereby an efficient system operation is accomplished without increasing the load of the data processor.

According to another aspect of the invention, in a communication controller as described above, the message includes a data field where data is stored and a type field which stores a code by which the above-mentioned type is shown, the type field being placed before the data field. According to such an aspect of the invention, the communication controller can promptly start preparation for making an interruption request to the data processor, thereby enabling efficient operation of the system.

According to yet another aspect of the invention, a communication controller comprises a first buffer for storing the data of a message of a type which requires immediate processing and a second buffer storing data of a message of a type which does not require immediate processing, wherein when data are stored in the first buffer, an interruption request is sent to a data processor at a higher priority and the data in the second buffer are transferred together with the data in the first buffer when the latter is transferred. According to such an aspect of the invention, the system can operate in conformity with a requirement for immediate processing of data without substantially increasing a frequency of interruption to the data processor.

DETAILED DESCRIPTION OF THE ILLUSTRATED EMBODIMENTS

Figure 1:
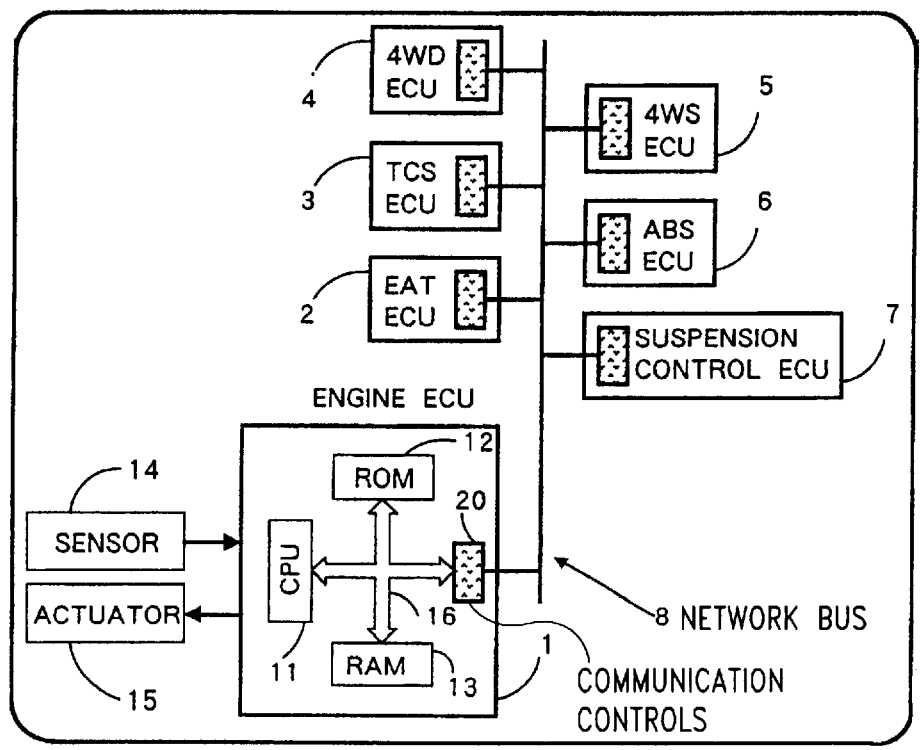
FIG. 1 is a block diagram which shows overall composition of an embodiment of an on-board computer network.

Referring now to the drawings, wherein like reference numerals refer to like parts throughout the various views unless otherwise indicated, illustrated embodiments of the present invention are described, taking an on-board computer network system as an example. Principals of embodiments of the present invention are applicable generally to a communication controller and are not limited in application to an on-board computer network.

FIG. 1 is a block diagram which shows an overall composition of an embodiment of an on-board computer network system, where a plurality of electronic control units (ECU) 1–7 are connected by a network bus 8. The plurality of ECUs 1–7 send messages to the network bus 8 in a message format (to be shown hereafter) and mutually exchange data.

An engine ECU 1 is an electronic control unit which controls the engine in such terms as injection quantity and ignition time etc. of the engine according to the operating condition of the vehicle. The engine ECU 1 comprises a data processor/central processing unit (CPU) 11 for executing operations, a nonvolatile read-only memory (ROM) 12 for storing computer programs, a random-access memory (RAM) 13 which temporarily stores various data and programs, and a communication controller 20 which receives messages from the network bus 8 and sends messages to the network bus 8. The CPU 11, ROM 12, RAM 13, and communication controller 20 are connected by a data bus 16.

The ROM 12 stores computer programs to be executed by the CPU 11 and tables of data to be used for computation by the CPU 11. The ROM 12 can be a rewritable ROM such as an electronically erasable programmable read-only memory (EEPROM).

The engine ECU 1 receives output signals from various sensors 14 (such as an inlet pipe pressure sensor, an air-fuel ratio sensor, and a sensor of water temperature of the engine), processes the output signals, and converts the output signals into digital signals indicating various parameters which show driving conditions. The engine ECU 1 carries out computation using these parameters and data read out from the ROM 12 and sends control signals to actuators 15, such as fuel injection valves and igniters. The engine ECU 1 receives data from the other ECUs 2–7 via the network bus 8 and carries out computation. Parameters and other data which are produced by the engine ECU 1 are sent to the other ECUs 2–7 through the network bus 8.

Connected to the network bus 8, in addition to the engine ECU 1, are an Electronic Control Automatic Transmission (EAT) ECU 2, a Traction Control System (TCS) ECU 3, a Four Wheel Drive (4WD) ECU 4, a Four Wheel Steering (4WS) ECU 5, an Anti-lock Braking System (ABS) ECU 6, and a Suspension Control ECU 7.

The basic compositions of these ECUs 2–7 are the same as that of the engine ECU 1, and include a CPU, a ROM, a RAM, and a communication controller. The ECUs 2–7 receive signals from related sensors and sends control signals to related actuators. These ECUs 2–7, as well as the engine ECU 1, receive data from the engine ECU 1 and other ECUs through the network bus 8, and transmits data to other ECUs.

According to a general technique, data transmitted between the ECUs 1–7 are received by the communication controller of each ECU and are temporarily stored in a buffer according to the various buffering scheme described above. An interruption request is then sent to the CPU and the data wait to be processed by the CPU.

Figure 2:
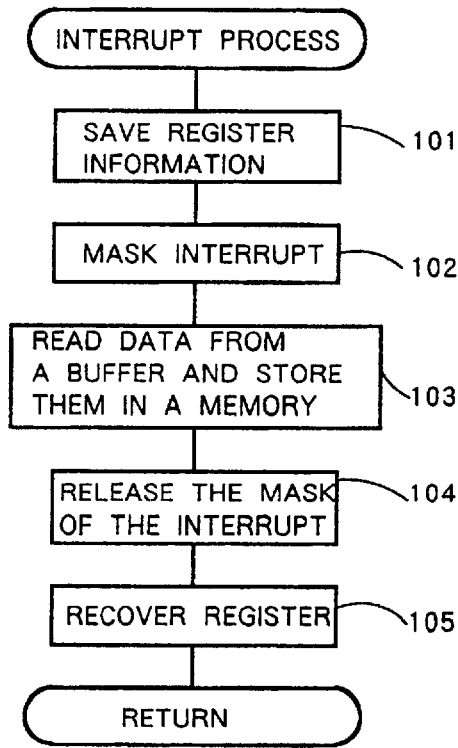
FIG. 2 is a flowchart which shows a general flow of interruption processing by a CPU when data are received.

FIG. 2 is a flow chart showing a general flow of such an interrupt process. Using the engine ECU 1 as an example, when an interrupt process begins, the CPU 11 saves register information, such as operands of a current operation or memory addresses being accessed into a (stack) memory (101), masks the interrupt so as not to accept other interrupts (102), reads the data from the buffer in the communication controller 20 and stores the data in the RAM 13 (103), releases the mask of the interrupt (104), retrieves the data stacked in 101 from the memory, puts the data into the original locations and resumes the operation being interrupted (105).

The data read from the communication controller 20 into the RAM 13 are immediately used in the subsequent operations. For example, if the data temporarily stored in the buffer of the communication controller 20 are the data of a transmission oil temperature which were sent from the transmission ECU 2, such data of the oil temperature are written to the RAM 13 by overwriting data of the oil temperature which were previously stored in a memory location of the RAM 13, and are then used in the subsequent operations.

Figure 3:
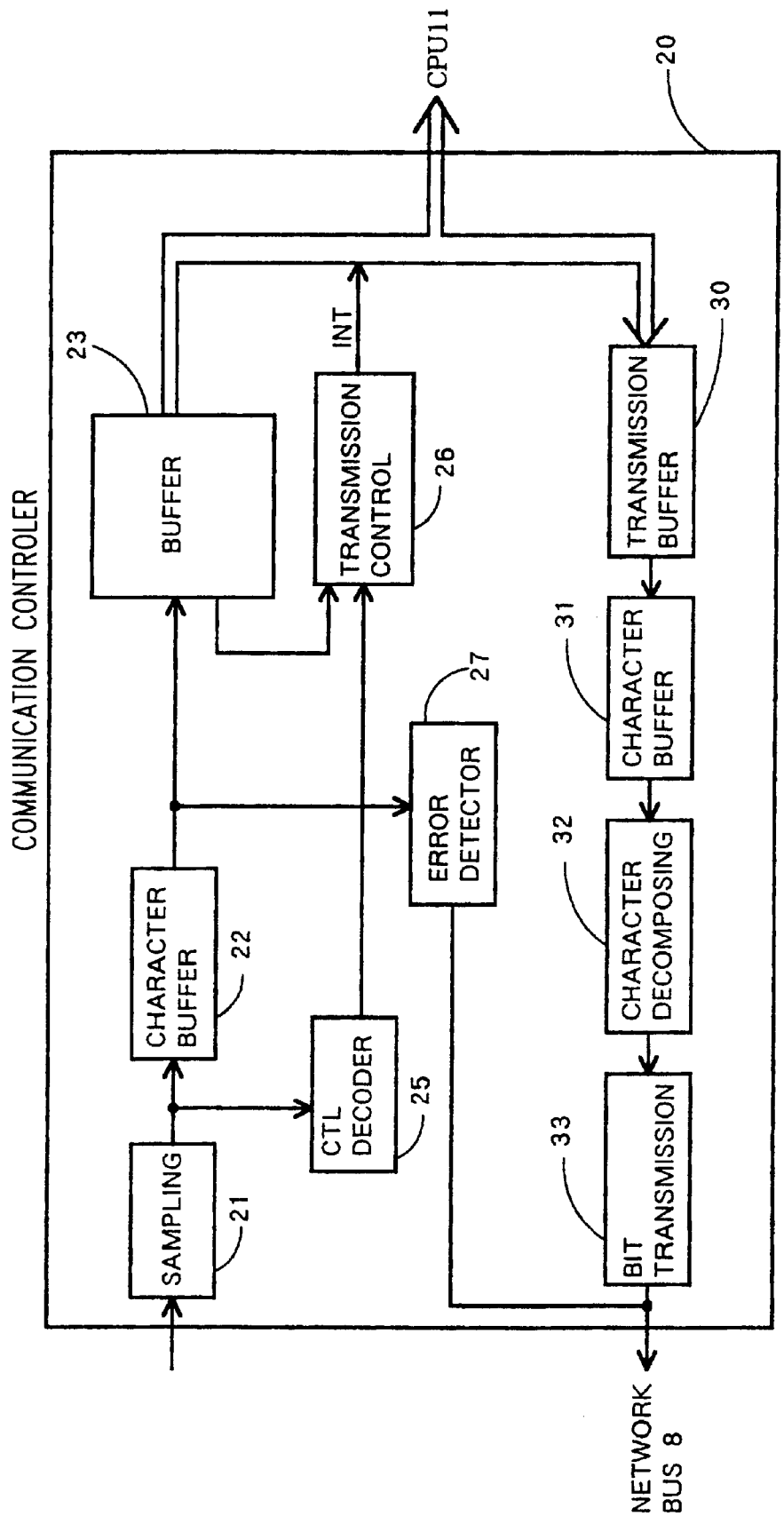
FIG. 3 is a block diagram which shows an overall composition of a communication controller in an embodiment of the present invention.

FIG. 3 is a block diagram of the communication control 20 according to an embodiment of the invention. The communication controller 20 comprises a sampling circuit 21 for sampling on a bit basis a message received from the network bus 8, a character buffer 22 for assembling the sampled bits into one byte (referred to as a "character" for convenience), a CTL decoder 25 for detecting and decoding bits in a CTL field from the sampled bits as will be described below, and a buffer 23 for receiving and temporarily storing the data bytes from the character buffer 22.

The CTL decoder 25 may be adapted to receive values of the CTL field from the character buffer 22 rather than from the sampling circuit 21. As will be described in detail below, the CTL field is a field for storing a code indicating types of the message transmitted, which, for example, indicate whether the data require immediate processing or not.

A transmission controller 26 monitors conditions of the data stored in the buffer 23 and sends an interrupt request signal INT to the CPU 11 when a predetermined condition is met. This operation will be described in more detail below.

The data bytes from the character buffer 22 are transferred to an error detecting unit 27 to detect errors in the received message. The error detecting unit 27 also has a function of detecting and correcting errors by CRC (Cyclic Redundancy Check) code from the received data. In the embodiment, if the error detecting unit 27 detects an error, it sends a negative acknowledgement (NACK) to a transmission node upon completion of receiving the message.

The communication controller 20 also comprises a transmission buffer 30 for receiving and temporarily storing a message transmitted from the CPU 11, a character buffer 31 for receiving data on a byte basis from the transmission buffer 30, a character decomposing unit 32 for decomposing bytes into bits, and a bit transmission unit 33 for transmitting the decomposed bits to the network bus 8.

Figures 4A, 4B:
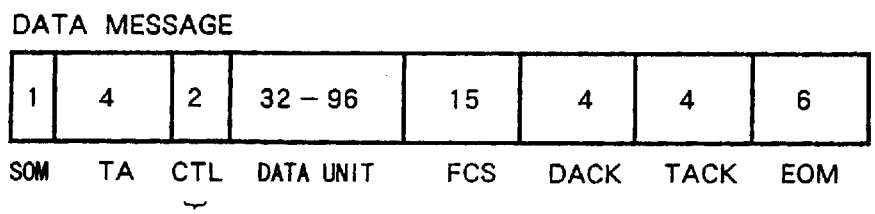
FIG. 4 shows a format of a message in an embodiment of the present invention.

FIG. 4 (A) shows a format of a data message which is transmitted between a plurality of ECUs via the network bus 8. The present embodiment relates to an on-board computer network and therefore the ECUs 1–7 are connected to the network. In general, communication controllers of a computer system or terminals are connected to the network, which constitutes a network system. Such a communication controller connected to the network is referred to as a "node" in terms of the communication network. The term "node" used in the following description corresponds to a communication controller of an ECU in this embodiment.

A SOM (Start Of Message) field is a field for storing one dominant bit which indicates start of the message. This dominant bit allows synchronization of all the nodes connected to the network system to be established.

A TA (Token Address) field is a field for storing an address (four bits) of a node which is a destination of a token. In the present embodiment, the network system uses a token passing scheme in which a node having a token is allowed to transmit to the network and thus the token is in turn passed to each of the plurality of nodes. It should be noted that the invention is not limited to the token passing scheme and is applicable to any other communication scheme.

The CTL (Control) field is a field for storing two bits which indicate types of the message. The types of the message indicated by the two bits are shown in FIG. 4 (B). As shown, a code "10" represents a message for passing the token to the next node. In such a case, a DATA_UNIT field, a FSC field, and a DACK field are not included in the message.

A code "01" of the CTL field indicates that the message is for transmitting data which do not require immediate processing. A code "11" represents that the message is for transmitting the data which require immediate processing.

The DATA_UNIT is a field which stores data contents to be transmitted and can store data of thirty-two bits (four bytes) to ninety-six bits (twelve bytes).

The FSC (Frame Check Sequence) field is a field of fifteen bits which stores results of performing CRC (Cyclic Redundancy Check) on a data string from the SOM field to DATA_UNIT.

The DACK (Data Acknowledge) field is a field which represents acknowledgement by a node which has received the data without errors. The DACK field comprises two acknowledgement bits in the first half and a delimiter of two recessive bits in the second half. The transmission node sets four recessive bits into the DACK field and transmits the message. When a node specified by a destination node field in the DATA_UNIT field receives the data without errors, the node writes dominant bits over the first two bits of the DACK field for acknowledgment. The transmission node monitors the message on the network. If the transmission node detects a dominant bit in either of the first two bits, it determines that the message is acknowledged.

A TACK (Token Acknowledge) field is a field which acknowledges reception of the token by a node which is specified by the TA field. The TACK field comprises two acknowledgement bits in the first half and a delimiter of two bits in the second half in the same manner as the DACK field.

An EOM (End Of Message) field is a field which indicates the end of a message. The transmission node puts six successive recessive bits into the EOM field.

In the description above, the dominant bit represents logic "1". The recessive bit indicates logic "0". The dominant bit may be written over the recessive bit. When the dominant bit and the recessive bit are simultaneously transmitted to the bus, the bus presents the logic of the dominant bit.

Referring again to FIG. 3, the data message received by the communication controller 20 is sampled on a bit basis by the sampling unit 21 and is assembled to a byte (eight bits)

in the character buffer 22. Two bits in the CTL field of the data message are decoded by the CTL decoder 25. If these two bits are "11" (indicating that the data require immediate processing), the transmission controller 26 transmits, responsive to the signal from the CTL decoder 25, the interrupt request signal INT to the CPU immediately after the data which requires immediate processing is stored in the buffer 23.

On the other hand, if the two bits of the CTL field are "01" indicating that the data do not require immediate processing, when the data stored in the buffer 23 has reached a predetermined amount, or when a predetermined time (e.g., one second) has elapsed from the time that the data began to be stored in the buffer 23, the transmission controller 26 transmits, responsive to a signal from the CTL decoder 25, the interrupt request signal INT to the CPU 11. When the data transmitted in a single message do not reach the predetermined amount, the interrupt request signal INT to the CPU 11 is not transmitted until the data in the buffer 23 reach the predetermined amount by subsequent one or more messages, or until the predetermined time has elapsed from the time that the data begins to be stored.

This predetermined amount of data may be defined based on the amount of data stored during, for example, 500 milliseconds under normal driving conditions of vehicle. Accordingly, the data which do not require immediate processing are sent to the data processing unit at a rate of once per 500 milliseconds, or at least once a second when the data amount is small.

If the data which require immediate processing arrive after the data which do not require the immediate processing have been stored in the buffer 23, the transmission controller 26 sends the interrupt request signal INT to the CPU 11 as described above. The CPU 11 accordingly begins an interrupt process and writes the data stored in the buffer 23 into a predetermined memory location in the RAM 13 of the data processing unit in the same manner as explained above with reference to FIG. 2. At that moment, the CPU 11 writes not only the data which require immediate processing but all the data stored in the buffer 23. Since the data transfer rates between the memories are much higher than rates of data processing, it is more efficient to transfer all the data in one interrupt process than in many interrupt processes.

Although the present embodiment is explained using the engine ECU 1 as an example, the RAM 13 also includes other predetermined memory locations each for the data which is transmitted from other ECUs 2–7. For example, data of a temperature of transmission oil which is transmitted from the EAT ECU 2, are written over oil temperature data which have been previously stored in a first memory location, while speed data are written over the speed data previously stored in a second memory location.

Since the transmission oil temperature does not change suddenly, the oil temperature data are read out by the CPU 11 at a relatively low rate, for example once per 500 milliseconds or once a second, and is then used for operations. On the other hand, since ignition timing of the engine needs to be controlled instantaneously according to the speed data, the speed data are read by the CPU 11 at a relatively high rate, for example once a millisecond or once a few milliseconds, and are used for operations. In this example, the oil temperature data are transmitted from the EAT ECU 2 to the engine ECU 1 as the data which do not require immediate processing, while the speed data are transmitted from the EAT ECU 2 to the engine ECU 1 as the data which require immediate processing.

Figure 5:
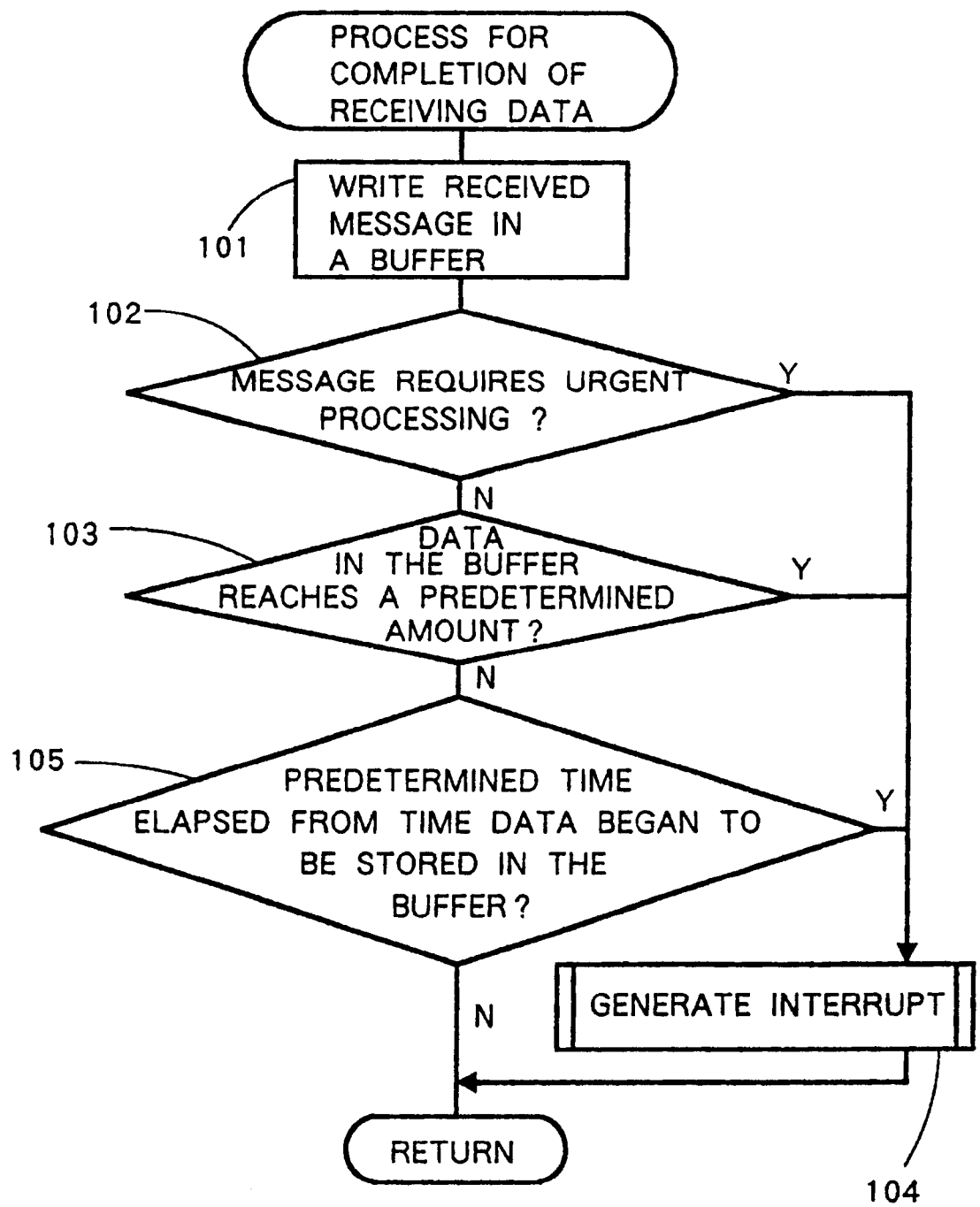
FIG. 5 is a flowchart showing a process of generating an interruption in an embodiment of the present invention.

FIG. 5 is a flowchart showing a flow of a process according to the embodiment described above. The data received by the communication controller 20 of the engine ECU 1 are written into the buffer 23 (101). The CTL decoder 25 decodes the CTL field in the received message, determines whether the message requires immediate processing or not (102), and transmits a signal indicative of a message type to the transmission controller 26. When the message requires immediate processing, the transmission controller 26 immediately transmits an interrupt request signal INT to the CPU 11 (104). When the message does not require immediate processing, the transmission controller 26 monitors whether the data stored in the buffer reach the predetermined amount (103). When the data reach the predetermined amount, the transmission controller 26 transmits the interrupt request signal INT to the CPU 11 (104). When the data do not reach the predetermined amount, the transmission controller 26 examines (105) whether a predetermined time (e.g., one second) has elapsed from the time that the data began to be stored in the buffer 23. When the predetermined time has elapsed, the interrupt request signal INT is sent to the CPU 11. When the predetermined time has not elapsed, the transmission controller 26 again examines the amount of the data in the buffer after a certain interval.

Figure 6:
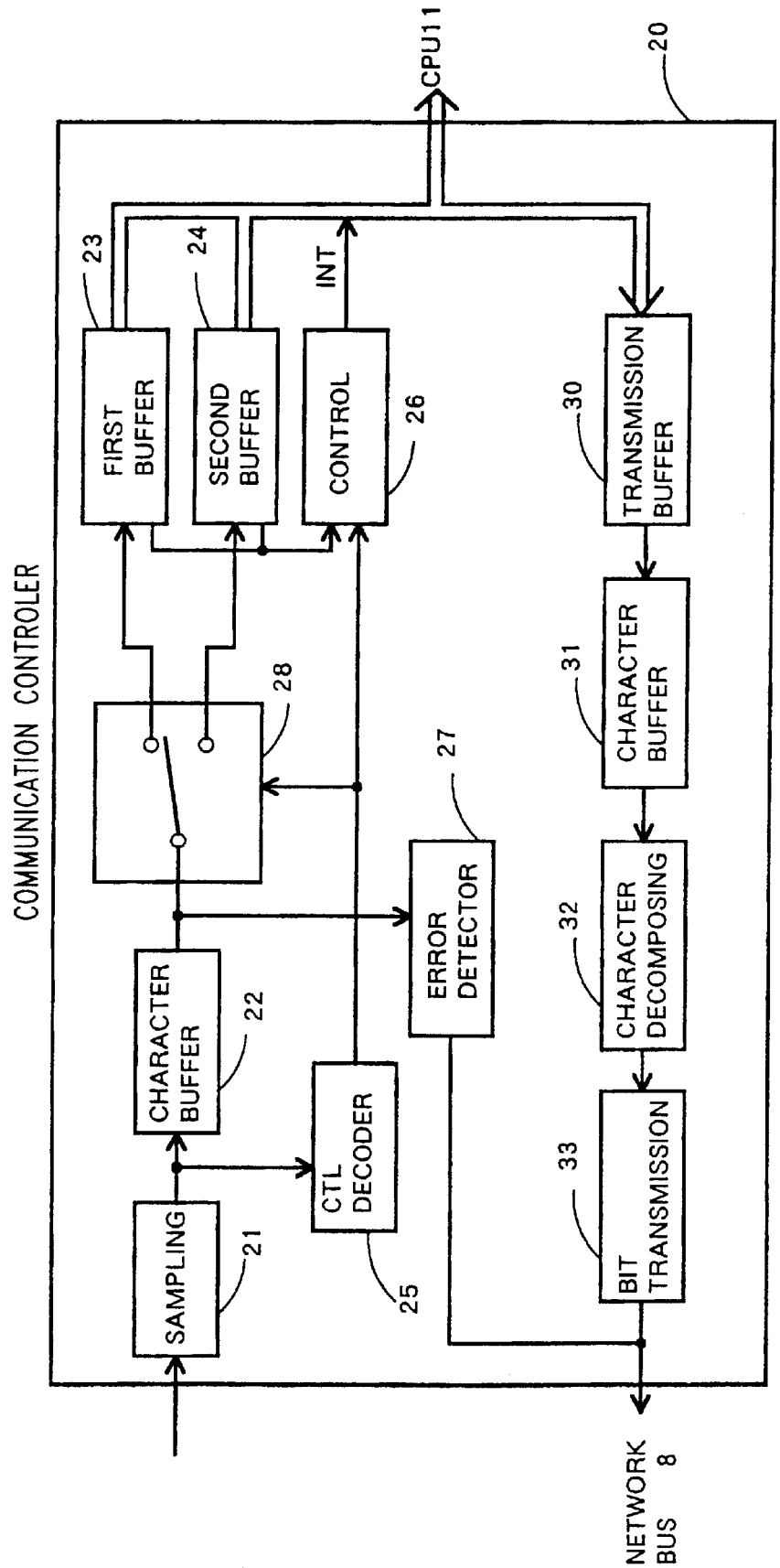
FIG. 6 is a block diagram which shows an overall composition of a communication controller in accordance with another embodiment of the present invention.

FIG. 6 is a block diagram of the communication controller 20 according to another embodiment of the invention. The communication controller 20 comprises a sampling circuit 21 for sampling on a bit basis a message received from a network bus 8, a character buffer 22 for assembling the sampled bits into a byte (referred to as a "character" for convenience), a CTL decoder 25 for detecting and decoding bits in a CTL field from the sampled bits as will be described below, a selecting unit 28 for switching transfer destinations of the data byte from the character buffer 22 according to values of the CTL field detected by the CTL decoder 25, and a first buffer 23 and a second buffer 24 for receiving and temporarily storing the data bytes from the character buffer 22.

The CTL decoder 25 may be adapted to receive the values of the CTL field from the character buffer 22 rather than from the sampling circuit 21. The CTL field is, as will be described in detail below, a field which stores a code indicating a type of the message transmitted, which, for example, indicates that the data require immediate processing or that the data do not require immediate processing.

A transmission controller 26 monitors conditions of the data which are stored in the first buffer 23 and the second buffer 24, and transmits the interrupt request signal INT to the CPU 11 when a predetermined condition is satisfied. This operation will be described in more detail below.

The data bytes from the character buffer are transferred to an error detecting unit 27 to detect errors in the received message. The error detecting unit 27 also includes a function of detecting and correcting errors in the received data by CRC (Cyclic Redundancy Check) code. In this embodiment, if the error detecting unit 27 detects an error, it transmits an error message with successive dominant bits to the network bus 8. In another embodiment, if an error is detected, the error detecting unit 27 transmits a negative acknowledgement (NACK) to a transmission node upon completion of receiving the message.

The communication controller 20 also comprises a transmission buffer 30 for receiving and temporarily storing the message to be transmitted from the CPU 11, a character buffer 31 for receiving data on a byte basis from the transmission buffer 30, a character decomposing unit 32 for decomposing bytes into bits, and a bit transmission unit 33 for transmitting the decomposed bits to the network bus 8.

Referring back to FIG. 6, the data message received by the communication controller 20 is sampled on a bit basis in the sampling circuit 21, and is assembled to a byte (eight bits) in the character buffer 22. Two bits of the CTL field of the data message are decoded by the CTL decoder 25. If the two bits are "11" (indicating that the data require immediate processing), the selecting unit 28 operates to send the data bytes from the character buffer to the first buffer 23 responsive to the signal from the CTL decoder 25.

On the other hand, if the two bits in the CTL field are "01" (indicating that the data do not require immediate processing), then a transfer destination of the data from the character buffer 22 is set to the second buffer 24 by the selecting unit 28 in response to the signal from the CTL decoder 25. In FIG. 6, although the selecting unit 28 is represented like a mechanical switch, the selecting unit 28 may be an electrical or a logical means which sets the destination of the data from the character buffer 22.

When the controller 26 receives from the CTL decoder 25 a signal indicating that the received data message requires immediate processing, it monitors input conditions of the data in the first buffer 23, and sends the interrupt request signal INT to the CPU 11 immediately after the entire data has been received without errors and stored in the first buffer 23.

The CPU 11 receives the interrupt request signal INT, begins an interrupt process in a stage where the process during execution permits the interrupt, and writes the data stored in the first buffer 23 into a predetermined memory location in the RAM 13. At this moment, the CPU 11 writes into the RAM 13 not only the data in the first buffer 23 but also the data in the second buffer 24. This is because transferring of all the data in one interrupt process is more efficient than doing so a number of separate interrupt processes.

When the controller 26 receives from the CTL decoder 25 a signal indicating that the data message being received does not require immediate processing, it monitors input conditions of the data in the second buffer 24, and sends the interrupt request signal INT to the CPU 11 immediately after the predetermined amount of data has been stored in the second buffer. This predetermined amount of data is set to an amount which is reached by a plurality of messages from a plurality of nodes. When a predetermined time (e.g., one second) has elapsed from a time that the data of the first received message begins to be stored in the second buffer 24, the controller 26 sends the interrupt request signal INT to the CPU 11 even when the data in the second buffer 24 does not reach the predetermined amount. The CPU 11 receives the interrupt request signal INT and handles an interrupt process as described above with reference to FIG. 2.

This predetermined amount is defined with reference to an amount of data stored during, for example 500 milliseconds, under normal driving conditions of the vehicle. In this manner, the data which does not require immediate processing is transmitted to the data processing unit at the rate of, for example once per 500 milliseconds or at least once a second, even when the data amount is small.

Although the embodiment is explained using the engine ECU 1 as an example, the RAM 13 also includes other predetermined memory locations for each of the data transmitted from other ECUs 2–7. The data on transmission oil temperature transmitted from the EAT ECU 2 are written over the data of oil temperature previously stored in a first memory location, while speed data are written over the speed data previously stored in a second memory location.

Since the transmission oil temperature does not change suddenly, the data of the oil temperature is read by the CPU 11 at a relatively low rate, for example once per 500 milliseconds or once a second, and is then used for operation. On the other hand, since the ignition timing of the engine needs to be controlled instantaneously in accordance with the speed data, the speed data are read by the CPU 11 at a relatively high rate, for example once a millisecond or once a few milliseconds, and are then used for operations. In this example, the data on the oil temperature is transmitted from EAT ECU 2 to the engine ECU 1 as the message which does not require immediate processing, while the speed data are transmitted from EAT ECU 2 to the engine ECU 1 as the message which require immediate processing.

Figure 7:
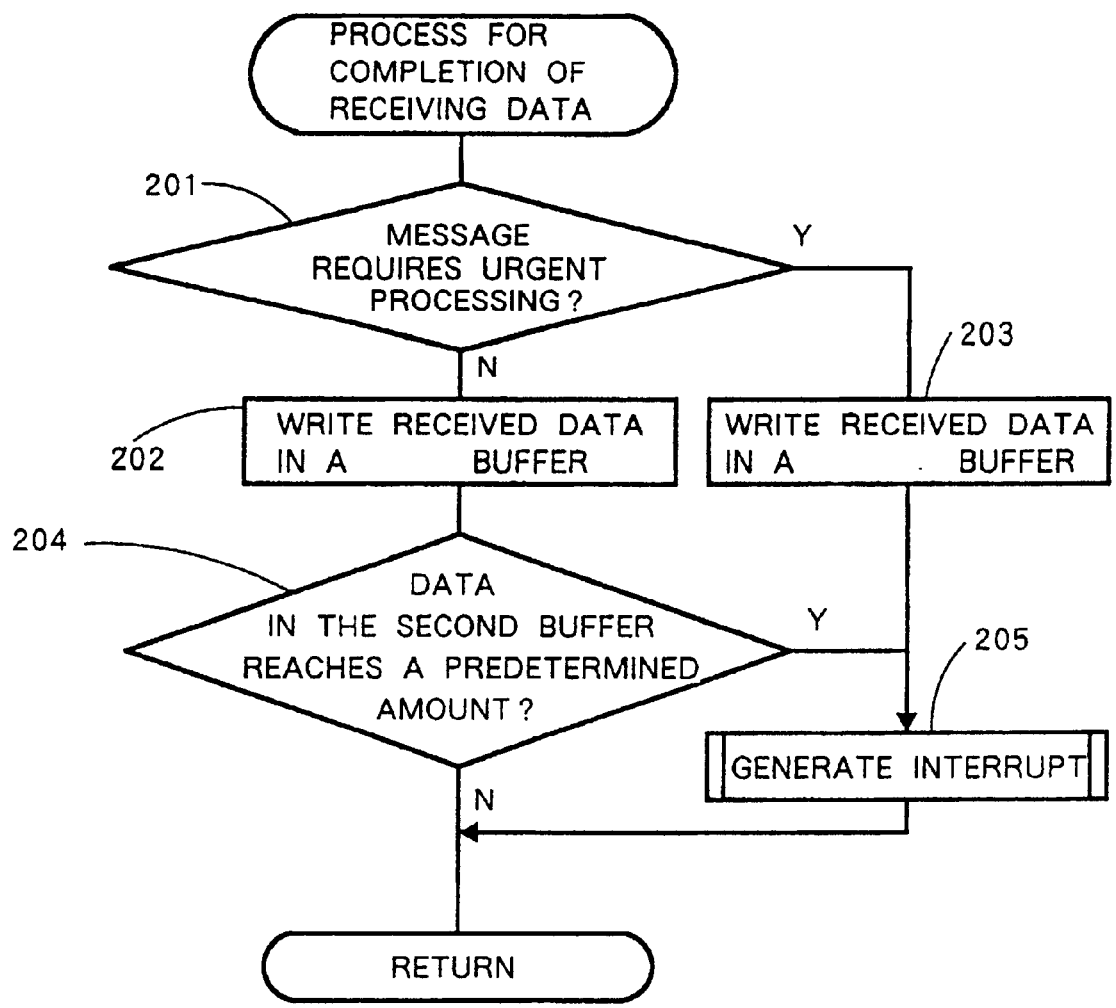
FIG. 7 is a flowchart showing a process for generating an interruption in accordance with another embodiment of the present invention.

FIG. 7 is a flowchart showing a process of generating an interrupt request by the communication controller according to the embodiment of the invention described. The CTL decoder 25 determines (201) whether the data message requires immediate processing or not. When the message requires immediate processing, the received data is written (203) into the first buffer 23. When the message does not require immediate processing, the received data is written (202) into the second buffer 24. Upon completion of writing into the first buffer 23, (203), the controller 26 transmits the interrupt request signal INT to the CPU 11 to cause the reception interrupt (205).

On the other hand, when the message does not require immediate processing, the controller 26 waits until the predetermined amount of data is stored in the second buffer 24 (204), and sends (205) the interrupt request signal INT to the CPU 11 to cause the reception interrupt when the data reaches the predetermined amount.

Although the embodiments of the present invention are described using an on-board computer network as an example, the invention is not limited to such embodiments and is applicable to any type of communication controller for data transmission. The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

The various embodiments described above can be combined to provide further embodiments. All of the above patents and applications are incorporated by reference. Aspects of the invention can be modified, if necessary, to employ the systems, circuits and concepts of the various patents and applications described above to provide yet further embodiments of the invention.

These and other changes can be made to the invention in light of the above detailed description. In general, in the following claims, the terms used should not be construed to limit the invention to the specific embodiments disclosed in the specification and the claims, but should be construed to include all communication controllers and systems that operate under the claims to transmit and process data. Accordingly, the invention is not limited by the disclosure, but instead the scope of the invention is to be determined entirely by the following claims, which are to be construed in accordance with established doctrines of claim interpretation.

What is claimed is:

1. A computer system having a data processor and a communication controller which controls reception of data to the data processor, said communication controller comprising:

a storage for storing data of a message being received;

a determining unit for determining whether the message being received requires immediate processing or not; and a transmission controller for immediately generating and sending to the data processor an interrupt request to transfer data stored in the storage to the data processor responsive to a determination by the determining unit that the received message requires immediate processing, wherein, when interrupt takes place in the data processor responsive to the interrupt request, data in said storage which have been stored by that time for transfer to the data processor are transferred to the data processor.

2. The computer system of claim 1 wherein the transmission controller generates an interrupt request for transferring the data when the data stored in the storage have reached a predetermined volume, thereby eliminating excessive delay in a transfer of low priority data.

3. The computer system of claim 1 wherein the transmission controller generates an interrupt request for transferring the data in the storage when a predetermined time has elapsed from a time that at least a portion of the data is stored in the storage, thereby eliminating excessive delay in a transfer of low priority data.

4. The computer system of claim 1 wherein the message includes a data field accommodating data and a type field accommodating a code indicating a type of the message, wherein the type field is placed before the data field.

5. The computer system of claim 1 wherein the storage comprises a first buffer to store messages of a type requiring immediate processing and a second buffer to store messages of a type not requiring immediate processing, wherein if data are stored in the first buffer, the interrupt request is sent to the data processor at a higher priority.

6. A communication controller connected to a data processor, comprising:

a plurality of buffers for storing data of a message being received, said plurality of buffers including at least a first buffer for storing messages of a type requiring immediate processing and a second buffer for storing messages of a type not requiring immediate processing; and a selection unit for selecting one of the plurality of the buffers according to types of the message being received;

wherein said communication controller immediately sends an interrupt request to the data processor when data is stored in the first buffer, and wherein the data in the second buffer are transferred to the data processor when the data in the first buffer are transferred to the data processor.

7. The communication controller of claim 6 wherein the message includes a data field which accommodates data and a type field which accommodates a code indicating said type, the type field being placed before the data field.

8. The communication controller of claim 6, further comprising a transmission controller to generate an interrupt request if a predetermined time has elapsed from a time that at least a portion of the data is stored in a storage unit or if data stored in a storage unit have reached a predetermined volume.

9. The communication controller of claim 6 wherein the plurality of storage units comprise a first storage unit to store messages of a type requiring immediate processing and a second storage unit to store messages of a type not requiring immediate processing, wherein if data are stored in the first storage unit, an interrupt request is sent to the data processor at a higher priority.

10. An on-board computer network system for an automobile, comprising:

an engine control unit having a data processor; and one or more electronic control units, each controlling a different element of the automobile, said electronic control units being connected to the engine control unit to form a network for exchanging messages, wherein the engine control unit comprises:

a memory for storing messages being received;

a determining unit for determining whether the message being received requires immediate processing or not; and a transmission controller for immediately generating and sending to a data processor an interrupt request to transfer data stored in the memory to the data processor responsive to a determination by the determining unit that the received message requires immediate processing, wherein data in the memory which have been stored by that time for transfer to the data processor are transferred to the data processor when an interruption takes place in the data processor responsive to the interrupt request.

11. The system of claim 10 wherein the memory comprises a first storage unit to store messages of a type requiring immediate processing and a second storage unit to store messages of a type not requiring immediate processing, wherein if data are stored in the first storage unit, the interrupt request is sent to the data processor at a higher priority.

12. The system of claim 10 wherein the transmission controller generates the interrupt request if a predetermined time has elapsed from a time that at least a portion of the data is stored in the memory or if data stored in the memory have reached a predetermined volume.

13. An on-board computer network system for an automobile, comprising:

an engine control unit having a communication controller and a data processor; and one or more electronic control units, each controlling a different element of the automobile, said electronic control units being connected to the engine control unit to form a network for exchanging messages, wherein the communication controller comprises:

a plurality of memories for storing messages which are received, said plurality of memories including a first buffer for storing the message of the type which requires immediate processing and a second buffer for storing the message of the type which does not require immediate processing; and a selection unit for selecting one of the plurality of the memories according to types of the message being received for storing the message therein; and wherein the communication controller immediately sends an interrupt request to the data processor when data are stored in the first buffer, and wherein the data in the second buffer are also transferred to the data processor when the data in the first buffer are transferred to the data processor.

14. The system of claim 13 wherein the communication controller generates an interrupt request if a predetermined time has elapsed from a time that at least a portion of the data is stored in the plurality of memories or if data stored in the plurality of memories have reached a predetermined volume, thereby eliminating excessive delay in a transfer of low priority data.

* * * * *